(12) United States Patent
Whitworth

(10) Patent No.: US 6,394,144 B1
(45) Date of Patent: May 28, 2002

(54) PTFE TUBE

(75) Inventor: Andrew John Whitworth, Grange-Over-Sands (GB)

(73) Assignees: John Andrew Whitworth; Gillian Whitworth; Helen Hollingworth; Maura Lockwood, all of Cumbria (GB)

(*) Notice: Subject to any disclaimer, the term of this patent is extended or adjusted under 35 U.S.C. 154(b) by 0 days.

(21) Appl. No.: 09/868,745

(22) PCT Filed: Dec. 24, 1999

(86) PCT No.: PCT/GB99/04425

§ 371 (c)(1),
(2), (4) Date: Sep. 20, 2001

(87) PCT Pub. No.: WO00/39494

PCT Pub. Date: Jul. 6, 2000

(51) Int. Cl.⁷ ................................................. F16L 11/00
(52) U.S. Cl. ........................ 138/121; 138/122; 138/177; 264/286
(58) Field of Search .................. 138/121, 122, 138/177, 178; 264/286

(56) References Cited

U.S. PATENT DOCUMENTS 5,476,080 A   12/1995  Brunnhofer
6,056,018 A  * 5/2000  Renaud ...................... 138/121
6,216,743 B1 * 4/2001  Kosaki et al. .............. 138/109
6,250,340 B1 * 6/2001  Jones et al. ................. 138/121

FOREIGN PATENT DOCUMENTS

| EP | 0 474 449 A2 | 3/1992 |
| GB | 1 543 586 | 4/1979 |
| GB | 2 293 222 | 3/1996 |

* cited by examiner

Primary Examiner—Patrick Brinson
(74) Attorney, Agent, or Firm—Townsend and Townsend and Crew LLP

(57) ABSTRACT

The present invention relates to a polytetrafluoroethylene (PTFE) tube, and more particularly to a PTFE tube for a flexible hose. In particular the invention relates to a PTFE tube having a smooth bore for use in the production of a lined hose assembly farther comprising hose braids, external hose protection and end fittings. The PTFE tube comprises external roots and peaks, which tube is obtainable from a non-convoluted tube having an original wall thickness $W_0$ and an internal diameter ID by a process in which a region of the tube is thinned to provide external convolutions with a root wall thickness $W_1$ characterised in that the convoluted PFTE tube has an improved resistance, of greater than 7.6%, to permeation by comparison with the non-convoluted tube, the comparison being made between tubes of (i) equal nominal bore ID; and (ii) equal weight of PTFE per unit length.

20 Claims, 4 Drawing Sheets

(i) apply deformation force at or above the gel transition temperature (ii) cool to below the gel transition temperature with a restraining force while convolutions become stable (iii) heat above the gel transition temperature in the absence of a restraining force

PTFE TUBE

The present invention relates to a polytetrafluoroethylene (PTFE) tube and more particularly to a PTFE tube for a flexible hose. In particular the invention relates to a PTFE tube having a smooth bore for use in the production of a lined hose assembly further comprising hose braids, external hose protection and end fittings.

It should be noted that there are two basic types of internal tube configuration;
smooth bore tubes, as their name suggests, have a substantially convolution free internal surface;
in contrast, internally convoluted tubes, as their name suggests, comprise a number of distinct peaks and roots.

Of course smooth bore tubes are often not totally devoid of bumps and indentations and may show rippling. This is however in sharp contrast to the induced peaks and roots of an internally convoluted tube.

PTFE is a unique material and is favoured for applications in the transport of foodstuffs and chemicals because of its chemical resistance and non-stick nature. However PTFE is not naturally elastic.

Producing a flexible PTFE tube for certain applications, particularly high pressure applications, where fluids, more particularly gases and vapours, are pumped through the tube has proved difficult. Indeed, it had previously been thought that many convoluted PTFE tubes would not be suitable for such applications because the "thinning" of the walls to produce "flex" was expected to result in increased permeation to fluids.

To reduce permeation one or more of the following techniques have hitherto been employed:
1. Wall thicknesses have been increased;
2. Higher grade polymers have been used; or
3. Polymers have been processed to have increased crystalinity.

Increasing the wall thickness decreases the flexibility of the finished product as well as increasing its weight and cost.

Increasing crystalinity increases the flexural modulus of the material thus decreasing the flexibility and this also incurs a reduction in flex life.

Du Pont, for example, define crystalinity as being low (50%), moderately high (72%) or very high (82%). At low crystalinity the product has a flexural modulus of 54,000 psi and a relative permeability to $CO_2$ gas of 6; at moderately high crystalinity the product has a flexural modulus of 150,000 psi and relative permeability to $CO_2$ gas of 0.8 and at a very high crystalinity the product has a flexural modulus of 170,000 psi and a relative permeability to $CO_2$ gas of 0.2.

Most corrugated products are made by a process which convolutes or concertinas the product and have walls which are substantially uniform in thickness throughout. Typical processes include those described in GB 1543586 and GB 2293222.

EP 474449 B1 on the other hand discloses a corrugated plastics tube which has been subject to a compression force to displace material in the root region. It is characterised in that the compression force applied was sufficient to take the plastics of the tube, which was at a temperature below its melt temperature, beyond its elastic point. This can be achieved at any temperature below the melt temperature and the patent makes no specific teaching in this regard. Furthermore, the patent relates to plastics in general and is directed to producing flexibility. It is not particular to PTFE (although PTFE is specified) and it does not address the problem of producing tubes with improved permeability resistance to gases.

In contrast the present invention, which is particular to PTFE, teaches that a novel product is obtained by a process comprising
1. subjecting the PTFE tube to a deformation force at a temperature at or above the gel transition temperature of PTFE to produce constrained convolutions having a thinned wall $W_1$; and
2. cooling the PTFE tube to below the gel transition temperature whilst continuing to constrain the deformations having the thinned wall $W_1$ until the convolutions having the thinned wall $W_1$ have become stable.

This product is characterised in that the convoluted PFTE tube has an improved resistance, of greater than 7.6%, to permeation by comparison with the non-convoluted tube, the comparison being made between tubes of (i) equal nominal bore ID; and (ii) equal weight of PTFE per unit length.

This improved resistance to permeation is indicative of the fact the product processed in this manner has a different form to one not so processed. This can be confirmed by way of the test procedure set out in the specific description.

Surprisingly, the applicants have discovered that by processing the PTFE, which term includes modified PTFE, in a particular manner they are able to reduce permeation rates for a given thickness of PTFE. That the PTFE processed in this manner has a changed form can be characterised by amongst other things, its improved resistance to permeation and increased tensile strength.

According to a first aspect of the present invention there is provided a PTFE tube comprising external roots and peaks which tube is obtainable from a non-convoluted tube having an original wall thickness $W_0$ and an internal diameter ID by a process in which a region of the tube is thinned to provide external convolutions with a root wall thickness $W_1$, characterised in that the convoluted PTFE tube has an improved resistance to permeation of greater than 7.6% by comparison with the non-convoluted tube, the comparison being made between tubes of (i) equal nominal bore ID; and (ii) equal weight of PTFE per unit length.

Preferably the PTFE tube has a smooth internal bore.

In one embodiment the smoothbore has a rippled appearance.

According to a further aspect of the present invention there is provided a method of producing a PTFE tube comprising external roots and peaks from a non-convoluted tube having an original wall thickness $W_0$ comprising:
1. subjecting the PTFE tube to a deformation force at a temperature at or above the gel transition temperature of PTFE to produce constrained convolutions having a thinned wall $W_1$; and
2. cooling the PTFE tube to below the gel transition temperature whilst continuing to constrain the deformations having the thinned wall $W_1$ until the convolutions having the thinned wall $W_1$ have become stable.

Preferably $W_1$ is less than 25% of $W_0$.

More preferably $W_1$ is about 20% of $W_0$. In a preferred embodiment the PRFE tube is produced on a mandrel of substantially the same size as the internal diameter of a plane cylindrical PTFE paste extruded tube such that the resulting tube is a smoothbore, externally convoluted, tube. The resulting smoothbore tube has a rippled appearance.

That the deformation has become stable can be characterised by an increase in tensile strength indicating that the deformation is a "yield" deformation. The deformation can be further characterised in that it is reversible. i.e. when the deformed material is reheated to at or above the gel transition temperature without a restraining force in place, it returns substantially to its original form.

It is also possible to determine whether or not the PTFE was deformed at a temperature above or below the gel transition temperature. A tube deformed below the gel transition temperature will revert partially or substantially to its original form at temperatures below the gel transition temperature whereas one deformed at or above the gel transition temperature will only revert substantially to its original form at or above the gel transition temperature.

The increase in tensile strength can be seen by conducting a simple test. A longitudinal section is taken from a convoluted tube prepared in accordance with the invention and is gripped on either side of a root. It is then pulled apart until the section breaks at the root. By first determining the thickness and width of the root and noting the force applied to break the tube at its root the breaking force per cross sectional area can be calculated. Another section of the tube is then heated to above the gel transition temperature so it reverts to its starting conformation and the section is then subjected to the same test i.e. it is pulled along the longitudinal axis of the tube. Typical results obtained will be 41368 kPa (6000 psi) for a plain tube and 75842 kPa (11000 Psi) for a convoluted tube manufactured in accordance with the invention.

The permeability properties of PTFE tubes deformed in this manner were totally unexpected as a product which was more permeable was expected as a consequence of a "thinning" of the walls.

For the avoidance of doubt the term gel transition temperature as used herein refers to the temperature at which PTFE becomes more transparent and amorphous. This is at a temperature of between 325° C. and 340° C. and is generally considered to be at a temperature of 327° C. This temperature is sometimes inappropriately, in a processing context, referred to as the melt temperature, see for example D. I. McCaine "Co-polymers with hexafluoropropylene" see page 630. The true "melt" temperature is the temperature at which the polymer melts from its gel state to form a liquid at which point it also begins to degrade and evaporate rapidly. This is at a temperature of above 550°, approaching "red heat", see for example R. J. Plunkett the inventor of PTFE.

Without wishing to be bound by theory it is believed that at temperatures above 327° C. a given applied deformation force is less likely to cause "cut" than the same deformation applied at temperatures below 327° C. Furthermore because the material is elastically deformed as opposed to being "cut" it benefits from improved characteristics, for example, improved resistance to permeability and increased tensile strength. These characteristics show themselves in the convoluted tubes ability to revert substantially to its original form on re-heating to above 327° C. without a restraining force in place. The greater the "cutting" during processing the greater the depth of any "nicks" which appear in the so reverted product and the less it will resemble its original form.

At processing temperatures below 327° C. the deformations will include, for a critical force, deformations beyond the products elongation break point which will not repair. Only deformations beyond yield, and not those beyond the products elongational break point will revert to their original shape on re-heating to above 327° C. "Cutting" can, of course, also occur at temperatures above the gel transition temperature if the deformation caused by the force is sufficient. The critical deformation will, however, be less at a temperature of below 327° C. For example, a smooth bore convoluted tube processed at below the gel transition temperature will, above a critical deformation, exhibit significant cut. Below this critical deformation a tube can only be thinned in the root region to between one third to one quarter of its original thickness. When processing at temperatures above the gel transition temperature, the tube can be thinned to about one fifth of its original thickness without exhibiting cutting.

Thus, according to another aspect of the present invention there is provided a PTFE tube comprising external roots and peaks, which tube is obtainable from a non-convoluted tube having an original wall thickness $W_0$ by a process in which a region of the tube is thinned to provide external convolutions with a root wall thickness $W_1$ characterised in that $W_1$ is less than 25% of $W_0$.

Preferably $W_1$ is about 20% of $W_0$.

The term "returns substantially to its original form" is intended to mean that the reverted tube does not have significant convolutions, although it may show signs of limited damage caused by deformations beyond elongation at break point in the form of cuts or nicks. The product will, however, return to within 20%, more preferably 10% and more preferably still 5% of its original wall thickness $W_0$.

Because the force applied to the tube to form roots is 3-dimensional it cannot readily be determined. However, the deformation can be measured as indicated above. As a general rule greater deformations can be achieved without cutting at higher temperatures. Above 327° C. deformation without cutting is about 20% better than below 327° C. as indicated by the greater thinning which can be achieved when processing at temperatures above the gel transition temperature. Of course the deformations can not be fixed above 327° C. therefore to fix the deformations a restraining force needs to be maintained whilst the temperature is dropped to below 327° C. such that the deformations become stable.

The invention will now be described, by way of example only, with reference to FIGS. 1 to 6 in which:

FIG. 1 is a schematic diagram showing the reversable nature of the production of a PTFE tube according to the invention;

FIG. 2 which is an enlarged sectional view of a segment of a PTFE tube comprising external roots and peaks and a smooth internal bore;

The invention is further illustrated with reference to a table, which shows the specification of a number of different sized tube and hose assemblies.

Finally, examples with comparative data, showing the improved permeability resistance of a tube processed in accordance with the invention are given.

Figure 1:
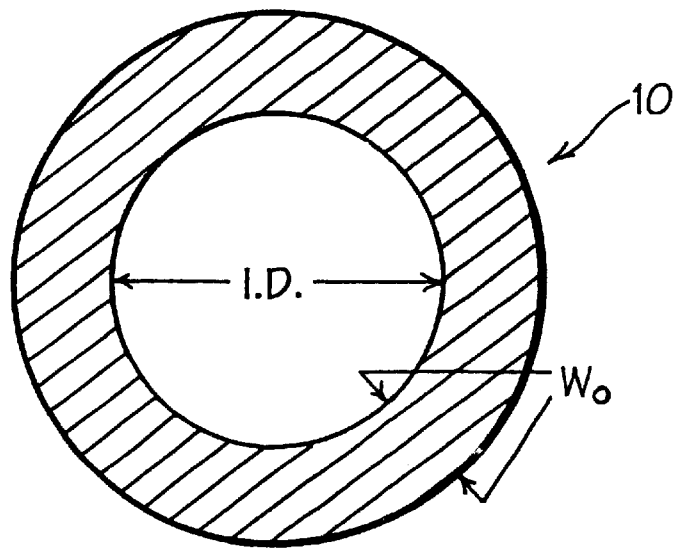
Figure 1:
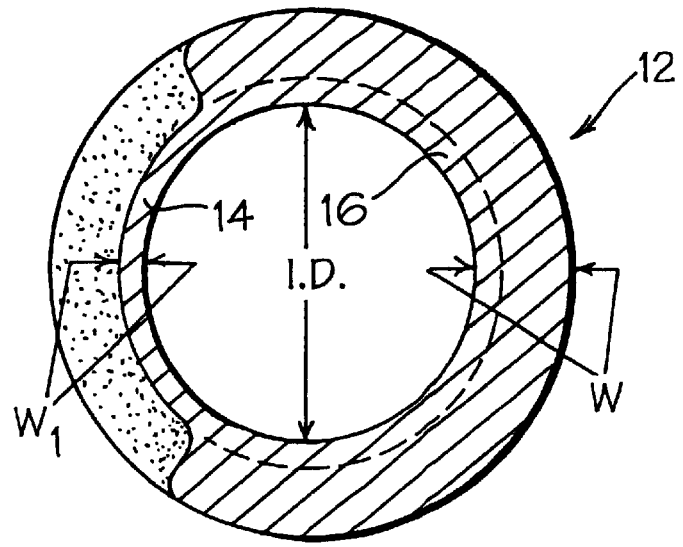

Referring to FIG. 1 a plane cylindrical PTFE paste extruded tube 10 with a internal diameter I.D. of 25.4 mm and a thickness $W_0$ of 2.29 mm was heated to 380° C. on a suitably sized mandrel. A tool with an internal diameter which was greater than the outside diameter of the mandrel but less than the combined diameter of the outside diameter of the mandrel and twice the wall thickness $W_0$ of the plastic tube was bought into contact with the tube so that its leading end applied a pressure sufficient to displace material to form a smooth bored convoluted tube 12 comprising roots 14, (with a root wall thickness $W_1$) and peaks 16 (with a peak wall thickness W) whilst maintaining the tube at a temperature above the gel transition temperature. The following end of the tool was maintained at a temperature below the gel transition temperature such that the following end of the tool cooled the convoluted tube to below the gel transition temperature whilst applying a restraining force such that the convolutions became stable. The helical tool was rotated relative to the mandrel at a speed of 18 revs per minute such that the leading end applied a 3-dimensional deformation force at above the gel transition temperature and the following end applied a restraining force until the temperature had dropped below the gel transition temperature and the convolutions had become stable. In this regard, each section of the convoluted tube was subjected to the restraining forces within the tool for approximately 1 minute.

Different shapes can of course be produced using the method. In one embodiment a single start spiral corrugation may be formed. Alternatively multiple start spiral corrugations, annular corrugations, axial corrugations or a combination thereof can be produced.

The root wall should be thinned from 60% to 5%, preferably 50% to 5%, of its original value Wo. For a fully corrugated shape the root wall should preferably be thinned to 40% to 20% or its original value and for a smooth bore shape to 30% to 20%.

Preferably a radiussed rather than square edge to the thinned region is formed.

As far as the width of the thinned area is concerned, working from original wall thickness Wo, the width should be 10%–200% of the peak wall thickness W for smooth bore type constructions and typically 30–600% of peak wall thickness for fully corrugated constructions. As the width tends to a greater percentage so the flexibility of the product increases.

The PTFE tube 12 has a root wall thickness $W_1$ which is less than the peak wall thickness W, when the root wall thickness $W_1$ has been reduced during construction from a standard wall thickness $W_0$ by compressing the tube to displace material.

Furthermore compression and displacement can cause the peak wall thickness W to be greater than the original wall thickness $W_0$.

As illustrated in FIG. 1 the resulting tube can be returned to its starting form by reheating the tube 12 to above its gel transition temperature without a restraining force in place.

RESULTS OF PERMEABILITY TESTS ON THE TUBES OF SAMPLE 1 AND SAMPLE 2

Figure 6:
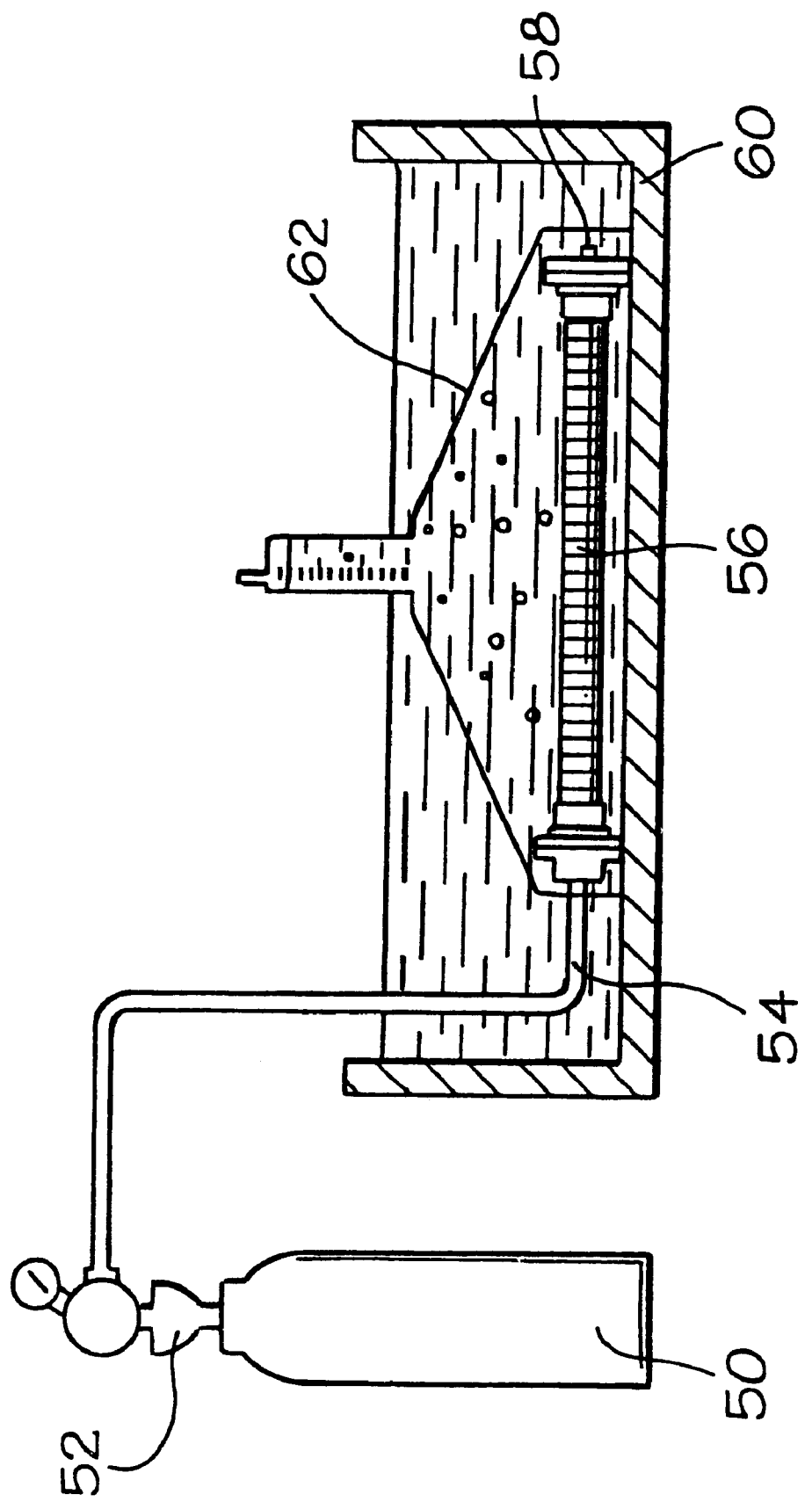
FIG. 6 is a diagram of an apparatus used for conducting the permeability test.

Two sample tubes were subjected to a permeability test using an apparatus as illustrated in FIG. 6. The apparatus comprises a helium supply 50, a pressure regulator 52, a connecting tube 54 and a bleed valve 58. The test sample 56 is connected between the connecting tube 54 and the bleed valve 58. The test sample is immersed horizontally in a water bath 60 and a collecting cowl 62 and calibrating column 64 positioned thereover. The samples 56, which are known lengths of PTFE tubing, are overbraided with end fittings swaged at both ends.

Prior to testing, the apparatus is first purged ensuring only helium remains in the sample (it is held vertically with the bleed valve the lower end). The sample is then immersed in the water bath, supported horizontally, and the helium pressure is increased to the test pressure. The apparatus is left for a minium of 30 minutes to allow steady state permeation to be achieved. The collecting cowl is placed over the sample, with water filling both it and the calibrated collecting column. Collection of all permeating gas is timed and the amount recorded. The procedure is repeated several times to ensure steady state permeation has been achieved and the results are reproducible.

Test Conditions

Commercial Grade Helium at 29.6 At (30 Bar) at Room Temperature.

Leakage is determined after steady state permeation has been reached on the samples as follows:

Sample 1. Plain cylindrical tube with an internal diameter of 25.4 mm and a wall thickness of 2.29 mm over braided with steel, end fittings swaged at each end.

Sample 2. Smooth bore convoluted tube with an internal diameter of 25.4 mm resulting from the processing of sample 1 in accordance with the methodology described with reference to FIG. 1 over braided with steel, end fittings swaged at each end.

Test Results

Sample 1 leakage rate 220 cc per hour per metre.
Sample 2 leakage rate 150 cc per hour per metre.

Since the weight of the tube per unit length in sample 2 was approximately 20% less than the weight of the material per unit length of sample 1, the figures were adjusted to give a figure for a tube of a given weight.

Thus the specific improvement in permeation resistance is $$\frac{220}{150} \times \frac{5}{4} = 1.83$$

in other words, the specific permeation has been reduced in the ratio of 1:0.55. Furthermore the flexibility is improved. In this regard sample 1 kinks at a bend radius of 381 mm whereas sample 2 kinks at a bend radius of 63.5 mm.

In a further test a comparison was made between a smoothbore externally convoluted tube made by the method of the invention and one made entirely at a temperature below 327° C.

The results of the comparison are given below:
Sample 3 (Plain tube). Leakage Rate 241 cc/h/m
Sample 4 (Externally convoluted tube processed below 327° C.) Leakage rate 224 cc/h/m.
Sample 5 (Externally convoluted tube processed above 327° C. and below 550° C. and cooled below 327° C. with a restraining force). Leakage Rate 148 cc/hr/m.

Figures are permeation rates of helium at 29.6 At (30 Bar) at room temperature.

Below 327° C. there is an apparent improvement of 7.6% whereas at above 327° C. there is a very significant improvement of 62.8%.

In practice it has been found that best results are achieved when the temperature is between 327° C.–450° C., more preferably 327° C.–420° C., since deformation is achieved without straining the material beyond the elongation break limit in any position in the convoluted configuration. The elongation limit increases with the processing temperature.

Whilst the invention has been specifically described with reference to a smooth bored convoluted tube, it will be apparent to the skilled man that convoluted tubes of various configurations can benefit from the method of the invention.

A tube as outlined above, particularly a smoothbore with external convolution, has many applications since it overcomes the disadvantages of either conventional smooth bore or internally and externally convoluted flexible hose designs, dramatically improving on many of their individual technical performance parameters.

Figure 2:
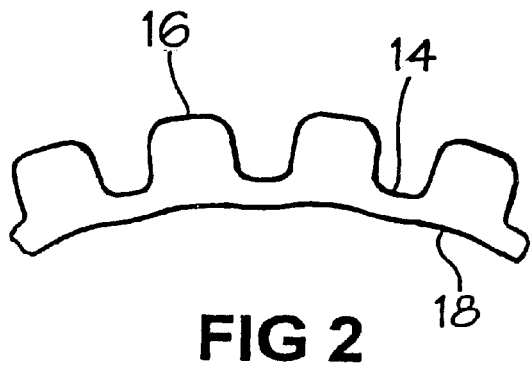

The tube can be used as a hose liner in a hose assembly. It comprises (see FIG. 2) integral rib sections (peaks) 16 which support the tube against kinking, vacuum and pressure and highly compressed web sections (roots) 14 leaving a smoothbore inner surface 18 which is rippled and provides excellent flexibility.

A hose comprising a smoothbore externally convoluted PTFE tube according to the invention shows significant improvement in properties when compared to a conventional convoluted hose (both internal and external convoluted). These include:

Vastly improved hygienic cleanability due to its smoothbore and polished surface finish;

Flow Rates which are more than 100% higher.

Pressure Ratings which are more than 50% higher.

Gas Permeation Resistance which is more than 150% higher; and

Flex Life at Temperature and Pressure which is more than 50 times the life (dependent upon test conditions).

Figure 3:
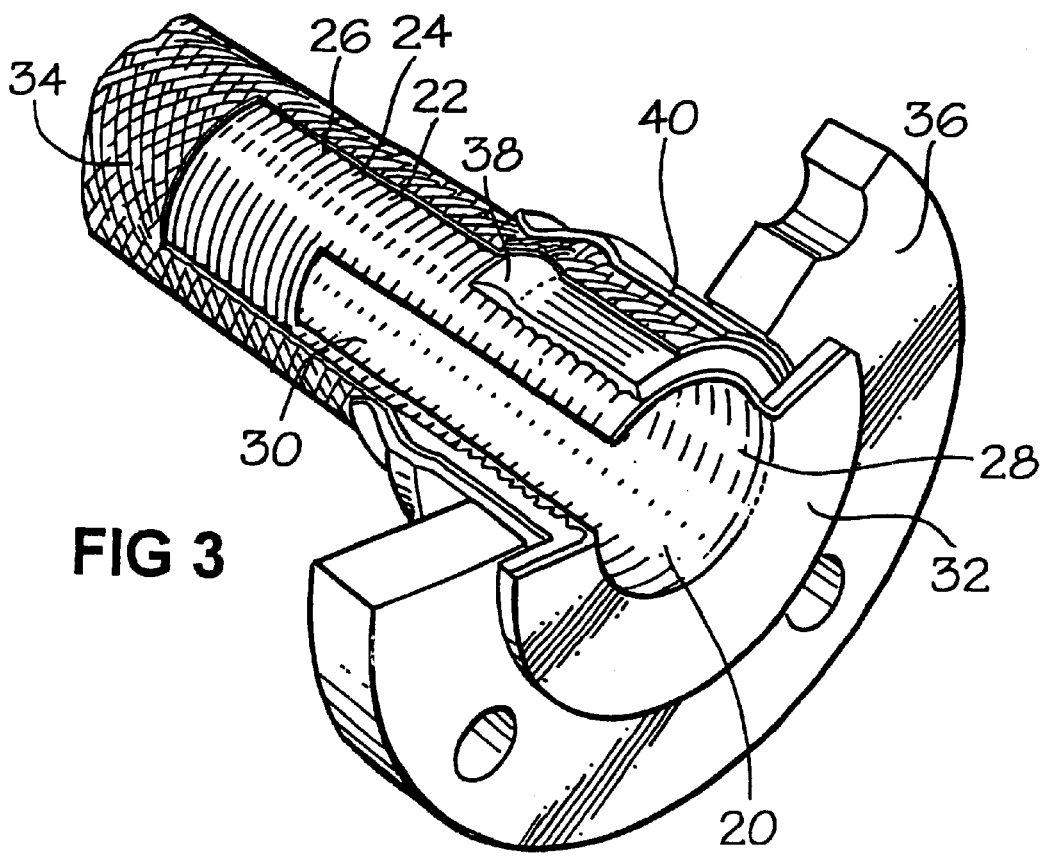
FIG. 3 is a cut-away view of a hose assembly comprising a (liner) tube according to the invention.

One type of hose comprising a PTFE tube according to the invention, is illustrated in FIG. 3. It comprises a PTFE liner tube 20, with external convolutions 22 of peaks 24 and roots 26 and a smooth internal bore 28 with slight ripples 30. The inner surface has been hot polished. The liner tube has a flared end 32. The external surface of the liner is covered with a braid 34 over most of its length. Attached to the ends of the tube are end fittings 36. A spigot 38 lies between the tube and braid and is secured by a ferrule 40.

The PTFE (line tube is either made from FDA approved PTFE (hose grade) or is made antistatic by the inclusion of, for example, carbon black. The former is, for use in all applications where fluids conveyed are not highly electrically resistant. The latter is suitable for use in applications where electrically resistive fluids, such as fuels, solvents or freons are being conveyed. The antistatic nature of the tube prevents a damaging electrostatic charge build-up inside the hose.

The unique properties of the smoothbore, externally convoluted tubes make them suitable for use in circumstances where conventional PTFE lined hoses would not be suitable.

Figure 4:
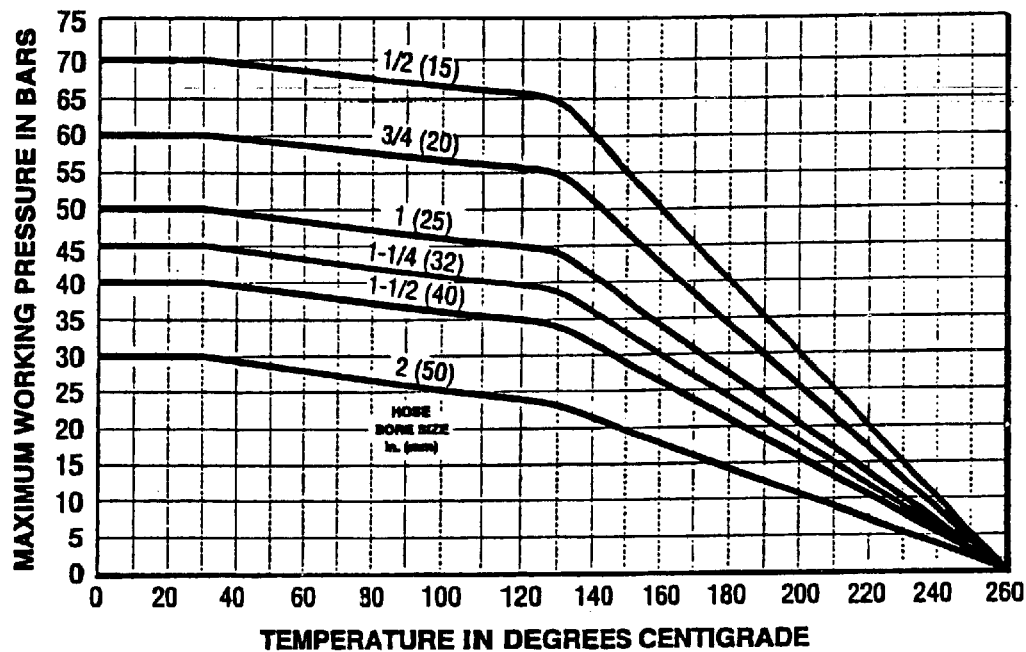
FIG. 4 is a graph showing maximum working pressure vs temperature for different sized PTFE tubes according to the invention.

In particular, hoses with a 15 mm–50 mm hose bore size can be used at full vacuum up to 130° C. Above this the vacuum resistance should be reduced 1% for every degree over 130° C. FIG. 4 shows the relationship between maximum working pressure (in Bars) vs temperature in °C for a range of hose sizes.

Figure 5:
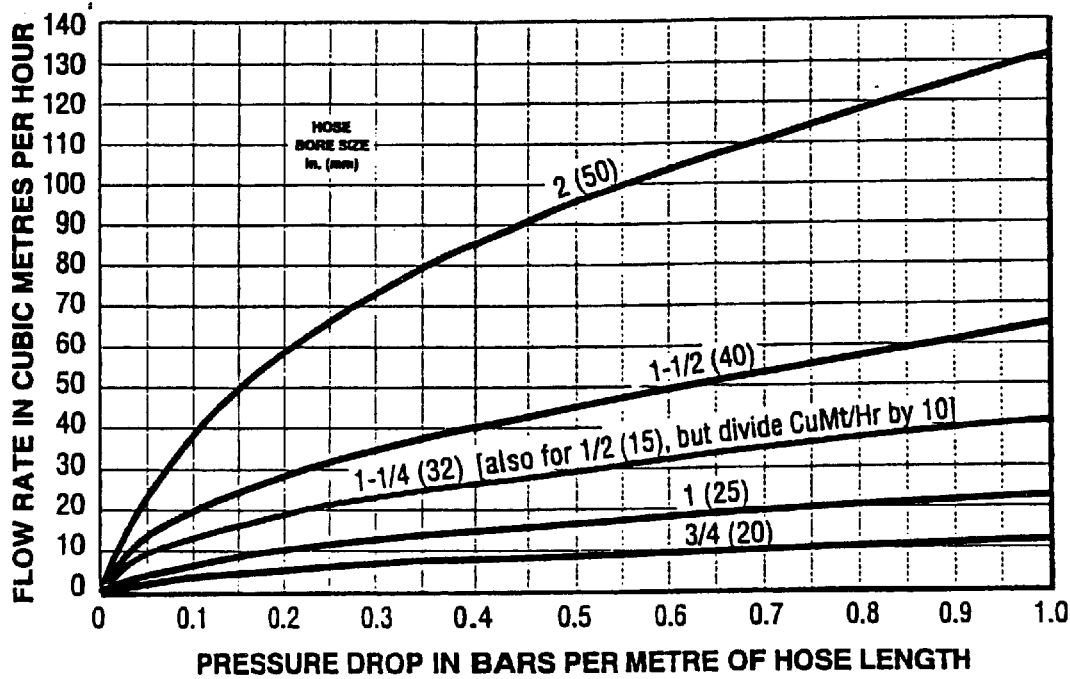
FIG. 5 is a graph of flow rate vs pressure drop for different sized tubes according to the invention.

Flow rates are also greater than for conventional convoluted PTFE hose. In a straight configuration, using water as a test medium, flow rates as illustrated in FIG. 5 can be achieved.

In practice, flow rates will vary with hose flexing, fluid viscosity, end fitting design and other parameters, but in general hose flow rates 2–3 times better than conventional convoluted PTFE hose were achieved.

The specification of typical products are illustrated in Table 1 below.

| Nominal Hose Bore Size mm | Actual Bore Size mm | O/D of Tube mm | Braid Type | O/D of Braid of Rubber mm | Min. Bend Radius mm | Maximum Working Pressure Bar | Minimum Burst Pressure Bar | Maximum Continuous Hose Length Mtrs | Weight per Unit Length Kg/Mtr |
|---|---|---|---|---|---|---|---|---|---|
| 15 | 12.7 | 15.4 | TO | — | 60 | 10 | 40 | 20 | .15 |
|  |  |  | SS | 16.5 | 38 | 70 | 280 | 20 | .29 |
|  |  |  | PB | 18.0 | 38 | 35 | 140 | 20 | .22 |
|  |  |  | SS,RC/FP/SI | 22.0 | 60 | 70 | 280 | 20 | .39 |
| 20 | 19.0 | 23.0 | TO | — | 75 | 10 | 40 | 20 | .20 |
|  |  |  | SS | 24.4 | 50 | 60 | 240 | 20 | .40 |
|  |  |  | PB | 25.8 | 50 | 30 | 120 | 20 | .28 |
|  |  |  | SS,RC/FP/SI | 30.0 | 75 | 60 | 240 | 20 | .55 |
| 25 | 25.4 | 30.5 | TO | — | 110 | 8 | 30 | 20 | .36 |
|  |  |  | SS | 31.9 | 70 | 50 | 200 | 20 | .63 |
|  |  |  | PB | 34.3 | 70 | 25 | 100 | 20 | .47 |
|  |  |  | SS,RC/FP/SI | 38.0 | 110 | 50 | 200 | 20 | .92 |
| 32 | 32 | 38.3 | TO | — | 130 | 6 | 24 | 20 | .45 |
|  |  |  | SS | 39.7 | 85 | 45 | 180 | 20 | .85 |
|  |  |  | PB | 42.1 | 85 | 23 | 90 | 20 | .72 |
|  |  |  | SS,RC/FP/SI | 45.7 | 130 | 45 | 180 | 20 | 1.15 |
| 40 | 38 | 45.0 | TO | — | 160 | 5 | 20 | 17 | .66 |
|  |  |  | SS | 46.8 | 100 | 40 | 160 | 17 | 1.10 |
|  |  |  | PB | 48.8 | 100 | 20 | 80 | 17 | .90 |
|  |  |  | SS,RC/FP/SI | 52.8 | 160 | 40 | 160 | 17 | 1.55 |
| 50 | 50.8 | 58.4 | TO | — | 230 | 3 | 12 | 10 | 1.25 |
|  |  |  | SS | 60.2 | 140 | 30 | 120 | 10 | 1.90 |
|  |  |  | PB | 62.2 | 140 | 15 | 60 | 10 | 1.60 |
|  |  |  | SS,RC/FP/SI | 66.2 | 230 | 30 | 120 | 10 | 2.56 |

Maximum Operating Temperatures: SS Braid −70° C. to +260° C., PB Braid −30° C. to +90° C. SS, RC and SS, FP −40° C. to +120° C., SS, SI −40° to +180° C.

Pressure Variation with Temperature: SS Braid as per FIG. 4; PB pressure as above over whole temperature range; RC, FP and SI grades are per FIG. 4, BUT only within the temperature range for the particular grade.

Key.
TO tube only
SS Stainless Steel
PB Polypropylene
RC Rubber covered
FP Fire proof
SI Silicon rubber covered.

Maximum Operating Temperatures: SS Braid −70° C. to +260° C., PB Braid −30° C. to +90° C. SS, RC and SS, FP −40° C. to +120° C., SS,SI −40° to +180° C.
Pressure Variation with Temperature: SS Braid as per FIG. 4; PB pressure as above over whole temperature range; RC, FP and SI grades are per FIG. 4, BUT only within the temperature range for the particular grade.
Key,
  TO tube only
  SS Stainless Steel
  PB Polypropylene
  RC Rubber covered
  FP Fire proof
  SI Silicon rubber covered.

A PTFE tube may be used as a lightweight hose per se, in applications where working pressures are low and where there is no need for the physical protection offered by an external braid.

Stainless steel (SS) braided hose is used in applications involving high temperatures and working pressures. High tensile grade 304 stainless steel wire is used, to give maximum pressure resistance and external protection to the hose.

Polypropylene braided (PB) hose is often preferred in application involving frequent handling and movement of the hose, and where temperatures are within the range −30° C. and +90° C. PB braid is lighter in weight, and any broken strands will not cut the operator's hands. In addition, PB braid is not prone to chloride stress corrosion.

Additional external protection may be provided over the braid.

For the most rugged applications where the hose may be subjected to rough treatment and severe external abrasion a rubber covering is provided it may also be added for hygienic applications, where external smoothness and cleanability of the hose is of prime importance.

The preferred rubber is EPDM which has excellent chemical resistance, and is temperature resistant up to 120° C.

Other external protection which may be used includes fireproof rubber; silicon rubber (resistant up to 180° C. and clear); scuffrings and protection coils.

A wide range of fittings may be incorporated to form a hose. They include swivel flux fittings (as illustrated in FIG. 3) or DIN 11851 fittings (male and female); cam action fittings, frictioned fittings and SMS and RTT fittings.

What is claimed is:

1. A PTFE tube comprising external roots and peaks, which tube is obtainable from a non-convoluted tube having an original wall thickness $W_0$ and an internal diameter ID by a process in which a region of the tube is thinned to provide external convolutions with a root wall thickness $W_1$, characterised in that the convoluted PTFE tube has an improved resistance to permeation of greater than 7.6% by comparison with the nonconvoluted tube, the comparison being made between tubes of (i) equal internal diameter ID; and (ii) equal weight of PTFE per unit length.

2. A PTFE tube as claimed in claim 1 wherein the improved resistance to permeation by comparison with the non-convoluted tube is greater than 10%.

3. A PTFE tube as claimed in claim 1 wherein the improved resistance to permeation by comparison with the non-convoluted tube is greater than 20%.

4. A PTFE tube as claimed in claim 1 wherein the improved resistance to permeation by comparison with the non-convoluted tube is greater than 30%.

5. A PTFE tube as claimed in claim 1 wherein the improved resistance to permeation by comparison with the non-convoluted tube is greater than 60%.

6. A PTFE tube as claimed in claim 1 having a smooth internal bore.

7. A PTFE tube as claimed in claim 1, which tube is obtained from a non-convoluted tube having an original wall thickness $W_0$ and an internal diameter ID by a process comprising:
  1. subjecting the PTFE tube to a deformation force at a temperature at or above the gel transition temperature of PTFE to produce constrained convolutions having a thinned wall $W_1$; and
  2. cooling the PTFE tube to below the gel transition temperature whilst continuing to constrain the deformations having the thinned wall $W_1$ until the convolutions having the thinned wall $W_1$ have become stable.

8. A PTFE tube as claimed in claim 1, which on heating to above its gel transition temperature without a restraining force in place returns to within 20% of the tubes original wall thickness $W_0$ but will not do so below the gel transition temperature.

9. A method of producing a PTFE tube comprising external roots and peaks from a non-convoluted tube having an original wall thickness $W_0$ comprising:
  1. subjecting the PTFE tube to a deformation force at a temperature at or above the gel transition temperature of PTFE to produce constrained convolutions having a thinned wall $W_1$; and
  2. cooling the PTFE tube to below the gel transition temperature whilst continuing to constrain the deformations having the thinned wall $W_1$ until the convolutions having the thinned wall $W_1$ have become stable.

10. A method of producing a PTFE tube as claimed in claim 9, wherein the tube is placed on a mandrel and a helical tool comprising a leading end and a following end is rotated relative to the mandrel at a speed such that the leading end applies a deformation force at above the gel transition temperature and the following end applies a restraining force until the temperature has dropped below the gel transition temperature and the convolutions have become stable.

11. A method as claimed in claim 10 wherein the mandrel is a plane cylindrical mandrel.

12. A method as claimed in claim 10 wherein the following end of the helical tool is maintained at a temperature below the gel transition temperature.

13. A method as claimed in claim 9 wherein $W_1$ is less than 25% of $W_0$.

14. A method as claimed in claim 13 wherein $W_1$ is about 20% of $W_0$.

15. A hose assembly comprising a PTFE tube as claimed in claim 1, a braid and one or more end fittings.

16. Use of a PTFE tube as claimed in claim 1 in a hose assembly for the purpose of improving the resistance to permeation of said hose assembly.

17. Use of a PTFE tube as claimed in claim 1 for the manufacture of a hose assembly intended to have improved resistance to permeation.

18. A method comprising passing a fluid through a PTFE tube or hose assembly under a pressure greater than atmospheric pressure characterized in that the fluid is passed through a PTFE tube as claimed in claim 1 or the hose assembly as claimed in claim 15.

19. A PTFE tube comprising external roots and peaks which tube os obtainable from a non-convoluted tube having an original wall thickness $W_0$ by a process in which a region of the tube is thinned to provide external convolutions with a root wall thickness $W_1$ characterized in that $W_1$ is less than 25% of $W_0$.

20. A PTFE tube as claimed in claim 19 wherein $W_1$ is about 20% of $W_0$.

* * * * *